(12) United States Patent
Shi et al.

(10) Patent No.: US 9,769,431 B2
(45) Date of Patent: Sep. 19, 2017

(54) ICE DETECTOR

(71) Applicants: COMMERCIAL AIRCRAFT CORPORATION OF CHINA, LTD, Shanghai (CN); COMMERCIAL AIRCRAFT CORPORATION OF CHINA, LTD SHANGHAI AIRCRAFT DESIGN AND RESEARCH INSTITUTE, Shanghai (CN)

(72) Inventors: Xianlin Shi, Shanghai (CN); Guopeng Nan, Shanghai (CN); Geping Li, Shanghai (CN); Xudong Xin, Shanghai (CN)

(73) Assignees: COMMERCIAL AIRCRAFT CORPORATION OF CHINA, LTD, Shanghai (CN); SHANGHAI AIRCRAFT DESIGN AND RESEARCH INSTITUTE, Shanghai (CN)

( * ) Notice: Subject to any disclaimer, the term of this patent is extended or adjusted under 35 U.S.C. 154(b) by 337 days.

(21) Appl. No.: 14/406,769

(22) PCT Filed: Dec. 3, 2013

(86) PCT No.: PCT/CN2013/088419
§ 371 (c)(1),
(2) Date: Dec. 10, 2014

(87) PCT Pub. No.: WO2014/086276
PCT Pub. Date: Jun. 12, 2014

(65) Prior Publication Data
US 2015/0163460 A1 Jun. 11, 2015

(30) Foreign Application Priority Data
Dec. 4, 2012 (CN) .......................... 2012 1 0513790

(51) Int. Cl.
| | |
|---|---|
| *H04N 7/18* | (2006.01) |
| *H04N 9/47* | (2006.01) |
| *B64D 15/20* | (2006.01) |
| *G06T 7/00* | (2017.01) |
| *H04N 5/225* | (2006.01) |
| *G06T 7/90* | (2017.01) |

(52) U.S. Cl.
CPC ............ *H04N 7/183* (2013.01); *B64D 15/20* (2013.01); *G06T 7/00* (2013.01); *G06T 7/90* (2017.01); *H04N 5/2252* (2013.01)

(58) Field of Classification Search
CPC ........ H04N 7/183; H04N 5/2252; G06T 7/90; G06T 7/00; G06T 7/408; B64D 15/20
(Continued)

(56) References Cited

U.S. PATENT DOCUMENTS

| | | |
|---|---|---|
| 4,461,178 A | 7/1984 | Chamuel |
| 4,553,137 A | 11/1985 | Marxer et al. |

(Continued)

FOREIGN PATENT DOCUMENTS

| | | |
|---|---|---|
| CN | 1673035 A | 9/2005 |
| CN | 102036878 A | 4/2011 |

(Continued)

OTHER PUBLICATIONS

International Search Report, dated Mar. 13, 2014.

*Primary Examiner* — Mehrdad Dastouri
*Assistant Examiner* — Kristin Dobbs
(74) *Attorney, Agent, or Firm* — Dority & Manning, P.A.

(57) ABSTRACT

An ice detector includes an icing assembly that includes a transparent icing rod with an illuminating element is disposed therein and having an ice accretion surface and a support structure. The icing rod has at least one visual sensor configured to obtain an image of the ice accretion surface; a controller electrically connected to the visual sensor and including an image contrast module configured to compare the obtained image with an initial image so as to judge (Continued)

whether ice is formed on the ice accretion surface of the icing rod. The icing assembly includes a refrigerating element respectively connected to the icing rod and the support structure. The refrigerating element may perform active refrigeration for the icing rod, reduce the surface temperature of the icing rod and facilitate the ice detector detecting ice accretion before ice is formed on a wing/nacelle.

13 Claims, 7 Drawing Sheets

(58) Field of Classification Search
   USPC .................................................. 348/144
   See application file for complete search history.

(56) References Cited

U.S. PATENT DOCUMENTS

| | | |
|---|---|---|
| 5,748,091 A | 5/1998 | Kim |
| 6,052,056 A | 4/2000 | Burns et al. |
| 7,104,502 B2 | 9/2006 | Otto et al. |
| 7,370,525 B1 | 5/2008 | Zhao et al. |
| 2005/0103927 A1 | 5/2005 | Barre et al. |
| 2011/0036949 A1 | 2/2011 | Depeige |
| 2013/0105631 A1 | 5/2013 | Chen et al. |
| 2013/0113926 A1 | 5/2013 | Chen et al. |
| 2013/0240672 A1* | 9/2013 | Meis .................. B64D 15/20 244/134 F |

FOREIGN PATENT DOCUMENTS

| | | |
|---|---|---|
| CN | 102313511 A | 1/2012 |
| CN | 102313512 A | 1/2012 |
| CN | 102336272 A | 2/2012 |
| CN | 103043216 A | 4/2013 |
| CN | 103101626 A | 5/2013 |
| CN | 103101627 A | 5/2013 |
| EP | 0 827 908 A1 | 3/1998 |
| GB | 2 250967 A | 6/1992 |
| GB | 2250967 A * | 6/1992 ............. B64D 15/20 |

* cited by examiner

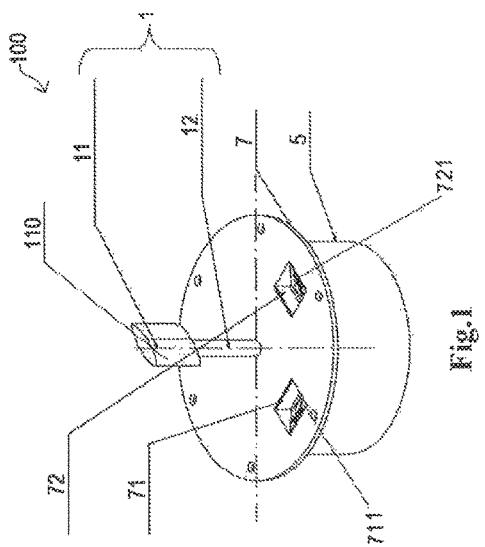
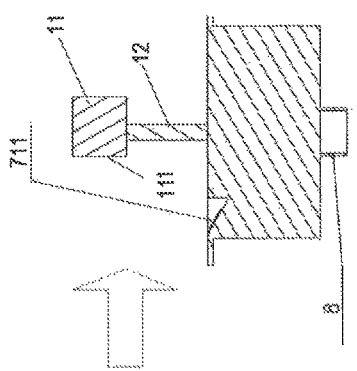
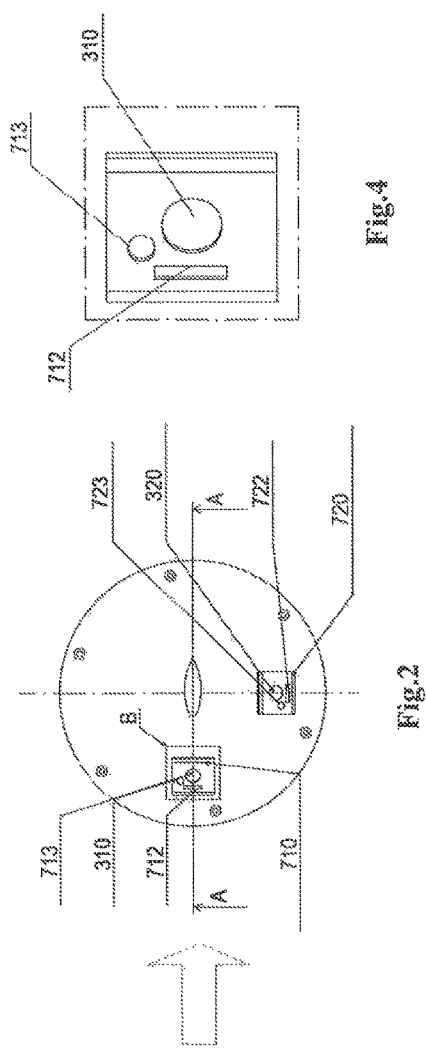

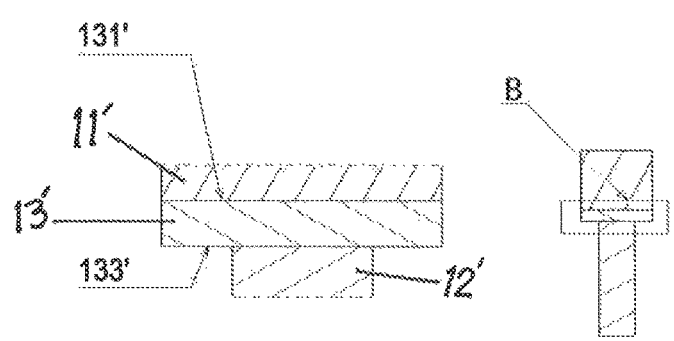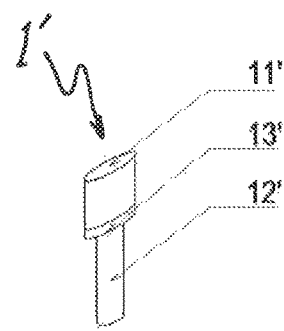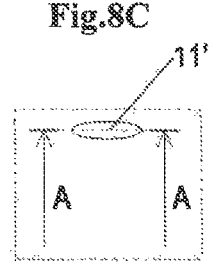
Fig.8D  Fig.8C  Fig.8A
Fig.8B

ICE DETECTOR

FIELD OF THE INVENTION

The present invention relates to the field of ice detection, and particularly to flight ice detecting device for detecting icing condition.

BACKGROUND OF THE INVENTION

When an aircraft flights under icing conditions, ice accretion very probably occurs at positions such as front edges of the wing and the cow of engine inlet. Icing results in the degradation of stability and operation of the aircraft, loss of aerodynamic performance and reduction of flight safety margin.

Most civil aircraft are equipped with the flight ice detection which can provide ice alert information for pilots to activate anti-ice system or auto-activate ant-ice system. The ice detection system is an important improvement for flight safety.

U.S. Pat. No. 4,553,137 discloses an ice detector based on a vibrating principle of magnetostrictive material. A probe of the ice detector is made of magnetostrictive material. When the aircraft enters icing conditions, increase of mass due to the ice causes the probe's vibration frequency to fall, and an icing signal is sent after the vibration frequency falls to a threshold value. This type of ice detector is extensively applied to aircraft such as A340, A380, B747, B777, ERJ-190, CRJ200 and ARJ. U.S. Pat. No. 7,104,502 also discloses an ice detector based on a vibrating principle of magnetostrictive material, which can improve ice detection performance at near freezing conditions by changing the supporting shape of the ice detector in U.S. Pat. No. 4,553,137.

U.S. Pat. No. 7,370,525 discloses a photoelectrical ice detector. U.S. Pat. No. 4,461,178 discloses an ultrasonic wave ice detector. U.S. Pat. No. 5,748,091 discloses a fiber optic ice detector.

In the paper Icing Detection Using Image-based 3D Shape Recovery (see Computer-Aided Design and Applications, 7(3), 2010, pages 335-347) published by Chunsheng Yu and Qingjin Peng, two sets of cameras are used to obtain icing pictures of power transmission lines, and an ice shape is obtained by image 3D reconstructing and contrast to judge whether ice is formed on the power transmission line; in Ice detection using image analysis (see http://winterwind.se/2012/download16_Combitech.pdf) published by COMBITECH Corporation of the United States is described a technology of using a camera to obtain a blade icing picture and analyzing and monitoring ice on blades of a wind power generator based on the images. Then, image processing technology is introduced into the field of icing detection. However, this kind of device is large in size and heavy in weight and inappropriate to be mounted on an aircraft as a flight ice detection.

Under near freezing conditions, there is a critical temperature difference between the ice detector and the edge of waiting/nacelle (the critical temperature of ice detector is higher than that of the front edge of wing/nacelle). The critical temperature difference can result in the ice accretion on the edge of wing/nacelle prior to the ice detector.

BRIEF SUMMARY OF THE INVENTION

Therefore, an object of the present invention is to provide an ice detector based on image processing technology which can eliminate the critical temperature difference.

To this end, according to an aspect of the present invention, there is provided an ice detector, comprising:

an icing assembly comprising an icing rod having an ice accretion surface and a support structure, wherein the icing rod is transparent and an illuminating element is disposed therein; at least one visual sensor configured to obtain an image of the ice accretion surface; a controller electrically connected to the visual sensor and comprising an image contrast module configured to compare the image obtained from the visual sensor with an initial image of the ice accretion surface so as to judge whether ice is formed on the ice accretion surface of the icing rod; wherein, the icing assembly comprises a refrigerating element respectively connected to the icing rod and the support structure.

In this aspect of the present invention, arranging the refrigerating element on the icing rod assembly to perform active refrigeration for the icing rod may reduce the surface temperature of the icing rod and facilitate ice accretion on the icing rod before ice is formed on the wing/nacelle.

Preferably, the refrigerating element is a semiconductor refrigerating element which cold end is connected to the icing rod to perform active refrigeration for the icing rod, and which hot end is connected to the support structure and dissipates heat via it.

Preferably, the semiconductor refrigerating element is disposed at a lower end of the icing rod, and the cold end is above the hot end.

Alternatively, the icing assembly may further be configured as follows: the icing rod has a first inner cavity, and the semiconductor refrigerating element is disposed in the first inner cavity of the icing rod; the semiconductor refrigerating element has a second inner cavity and an upper end of the support structure extends into the second inner cavity; the cold end of the semiconductor refrigerating element is outside and the hot end is inside.

Preferably, the icing rod is constructed as a streamlined wing-shaped structure. In this way, the ice accretion surface has a smaller pressure coefficient. The smaller pressure coefficient means a lower surface temperature and a higher critical temperature. It facilitates the ice accretion on the icing rod before ice is formed on the wing/nacelle.

Further preferably, the lateral side of the icing rod is configured to be wavy in a chordwise direction to facilitate water collection.

Again further preferably, the icing rod has a sufficient length in a chordwise direction to ensure that supercooled large water droplets, in the event of break, splashing or the like, can freeze on the lateral side of the icing rod. This enables the ice detector of the present invention to have an ability to detect supercooled large water droplets so that the use scope of the ice detector of the present invention is expanded.

Again more preferably, a front edge of the icing rod is configured to be cylindrical or wing-shaped.

More preferably, a curvature of the front edge of the icing rod is small enough to allow a water-collection coefficient of the icing rod to top 0.9.

Preferably, one of the at least one visual sensor is arranged exactly opposed to the ice accretion surface, and the other of the at least one visual sensor is arranged laterally opposed to the ice accretion surface. The positions of the icing rod and the visual sensor are arranged in a coordinated manner to better obtain the ice image of the icing rod.

Preferably, the visual sensor is a miniature camera device.

Preferably, each of the at least one visual sensor at least comprises a lens and an image sensor, wherein the lens is used to obtain the image of the ice accretion surface, and the image sensor is electrically connected to and transmits the image to the image contrast module of the control unit.

More preferably, the ice detector further comprises a flange plate connected between the icing assembly and the controller. The ice detector is mounted on an aircraft via the flange plate. A recessed chamber with a transparent window is provided on the flange plate, and the lens of the visual sensor is exposed in the recessed chamber. The recessed chamber is provided on the flange plate such that the lens of the visual sensor is exactly opposed to and/or laterally opposed to the ice accretion surface of the icing rod and the transparent window provides protection for the lens and prevents the lens from mist.

More preferably, the recessed chamber has a slant surface facing towards the icing assembly, and the lens is exposed from the slant surface. The arrangement of the slant surface provides convenience and greater flexibility for the arrangement of the visual sensor relative to the icing rod.

Further preferably, the slant surface of the recessed chamber is provided with an automatically adjustable illuminating element, and/or the visual sensor itself carries an illuminating element such as an automatically adjustable flash lamp. The arrangement of the illuminating elements helps the visual sensor to better obtain the image of the ice accretion surface under different light intensity conditions.

Preferably, the icing rod is provided with an electrical heater for deicing, and the electrical heater is used to remove accumulated ice from the icing rod after ice is detected, and then ice detection enters next cycle of ice accretion-detecting ice-heating to remove ice-cooling and cooling. The transparent window is provided with an anti-ice electrical heater. The arrangement of the electrical heater assists in keeping an inner surface of the transparent window from mist and keeping an outer surface from icing, and on the one hand, ensures that the transparent window remains transparent so that the visual sensor effectively obtains true icing conditions of the ice accretion surface, and on the other hand ensures that air in the recessed chamber is higher than a dew point temperature, thereby effectively preventing mist forming on the lens surface.

More preferably, the controller further comprises a heating control module which is electrically connected to the image contrast module and used to control the electrical heaters to perform electrical heating.

Preferably, the illuminating element is disposed in the icing rod to better outline the shape of ice and cooperate with the visual sensor to obtain images of the icing rod under different light intensities and improve reliability of ice detection.

Further preferably, the illuminating element comprises two sets of illuminating elements which are respectively disposed at a front edge and a middle-rear portion of the transparent icing rod.

Preferably, the ice accretion surface of the icing rod is provided with color marks facilitating color identification, which help better outline the shape of the ice.

These aspects and other aspects of the present invention will be made apparent with reference to the embodiments described hereunder.

BRIEF DESCRIPTION OF DRAWINGS

The structure and operation manner and further objectives and advantages of the present invention can be better understood by virtue of the following description with reference to figures, wherein same or like reference numbers denote same or like elements:

FIG. 1 illustrates an isometric diagram of an ice detector according to a preferred embodiment of the present invention;

FIG. 2 is a top plane view of the ice detector of FIG. 1, wherein an arrow indicates an air stream direction;

FIG. 3 is a sectional view taken along line A-A of the ice detector of FIG. 2, wherein an arrow indicates an air stream direction;

FIG. 4 is a partial enlarged view of portion B of the ice detector of FIG. 2;

FIG. 8A illustrates an isometric diagram of a preferred embodiment of an icing assembly of the ice detector of FIG. 1, wherein a semiconductor refrigerating element is arranged between an icing rod and a support structure in a longitudinal direction;

FIG. 8B illustrates a top planar view of the icing assembly of FIG. 8A;

FIG. 8C illustrates a sectional view taken along line A-A of the icing assembly of FIG. 8B;

FIG. 8D illustrates a partial enlarged view of portion B of the icing assembly of FIG. 8C;

DETAILED DESCRIPTION OF PREFERRED EMBODIMENTS

Figure 5A:
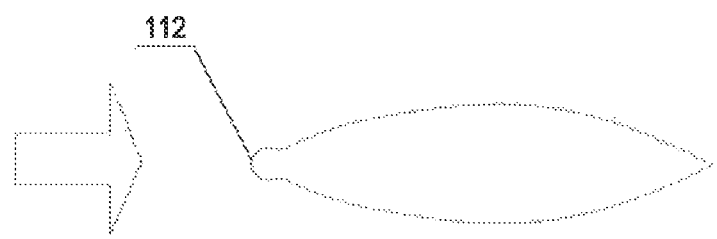
FIG. 5A illustrates a cross-sectional view of a first embodiment of an icing rod of the ice detector of FIG. 1, wherein an arrow indicates an air stream direction.

As required, specific embodiments of the present invention will be revealed here. However, it should be appreciated that embodiments revealed here are only typical examples of the present invention and the present invention can be embodied in various forms. Therefore, details revealed here are not considered as being limiting and only serve as a basis of claims and a typical basis for teaching those skilled in the art to differently apply the present invention in any suitable manner in practice, including use of various features revealed herein and combination of features that might not explicitly be revealed herein.

The term "icing condition" in the text should be understood as icing conditions and supercooled large droplet icing conditions defined by Appendix C of Chinese Civil Aviation Regulations Part 25, "transport category aircraft airworthiness standards" (CCAR-25). The term "water" in the text should be understood as supercooled droplet under icing condition.

An ice detector according to a preferred embodiment of the present invention is shown in FIGS. 1-4. As shown in FIGS. 1-4, in combination with FIGS. 5A, 5B and 6, the ice detector 100 comprises: an icing assembly 1, a visual sensor 31 and a controller 5. The icing assembly 1 comprises an icing rod 11 and a support rod 12 supporting the icing rod 11 and enabling it to extend into air stream and serving as a support structure. The icing rod 11 has an ice accretion surface 110 on an outside wall thereof. The visual sensor 31 is arranged exactly opposed to a front edge 111 of the icing rod 11 to obtain an image of the ice accretion surface 110. The visual sensor 31 comprises a lens 310 and an image sensor (CCD or CMOS) 311 (see FIG. 6). The controller 5 is configured to be electrically connected to the visual sensor 31 and comprises an image contrast module 510 (see FIG. 6) to compare the image from the visual sensor 31 with an initial image of the ice accretion surface 110.

In the preferred embodiment shown in FIG. 1, the ice detector 100 preferably has a flange plate 7 by which the ice detector is mounted on the aircraft. The flange plate 7 is mounted between the icing assembly 1 and the controller 5 to support the icing assembly 1 on the one hand and to mount the visual sensor 31 on the other hand. Specifically, as shown in FIG. 1, in combination with FIGS. 2-4, a recessed chamber 71 with a transparent window 710 is provided on the flange plate 7, and the lens 310 of the visual sensor 31 is exposed in the recessed chamber 71. The recessed chamber is provided on the flange plate such that the lens 310 of the visual sensor 31 is exactly opposed to the ice accretion surface of the front edge 112 of the icing rod and the transparent window 710 provides protection for the lens. Preferably, there is a slant surface 711 facing towards the icing assembly 1 in the recessed chamber 71, and the lens 310 is exposed from the slant surface. The arrangement of the slant surface provides convenience for the arrangement of the visual sensor relative to the icing rod. Further preferably, an automatically adjustable illuminating element 712 is provided on the slant surface 711 of the recessed chamber 71. Certainly, the visual sensor 31 itself may also carry an illuminating element such as an automatically adjustable flash lamp. The illuminating element helps the visual sensor 31 to better obtain an image from the ice accretion surface 110. Again further preferably, the slant surface 711 of the recessed chamber 71 is further provided with a light measuring element 713 electrically connected to the illuminating element 712 to sense light brightness in the surrounding environment and trigger the illuminating element 712 to work when needed.

Figure 6:
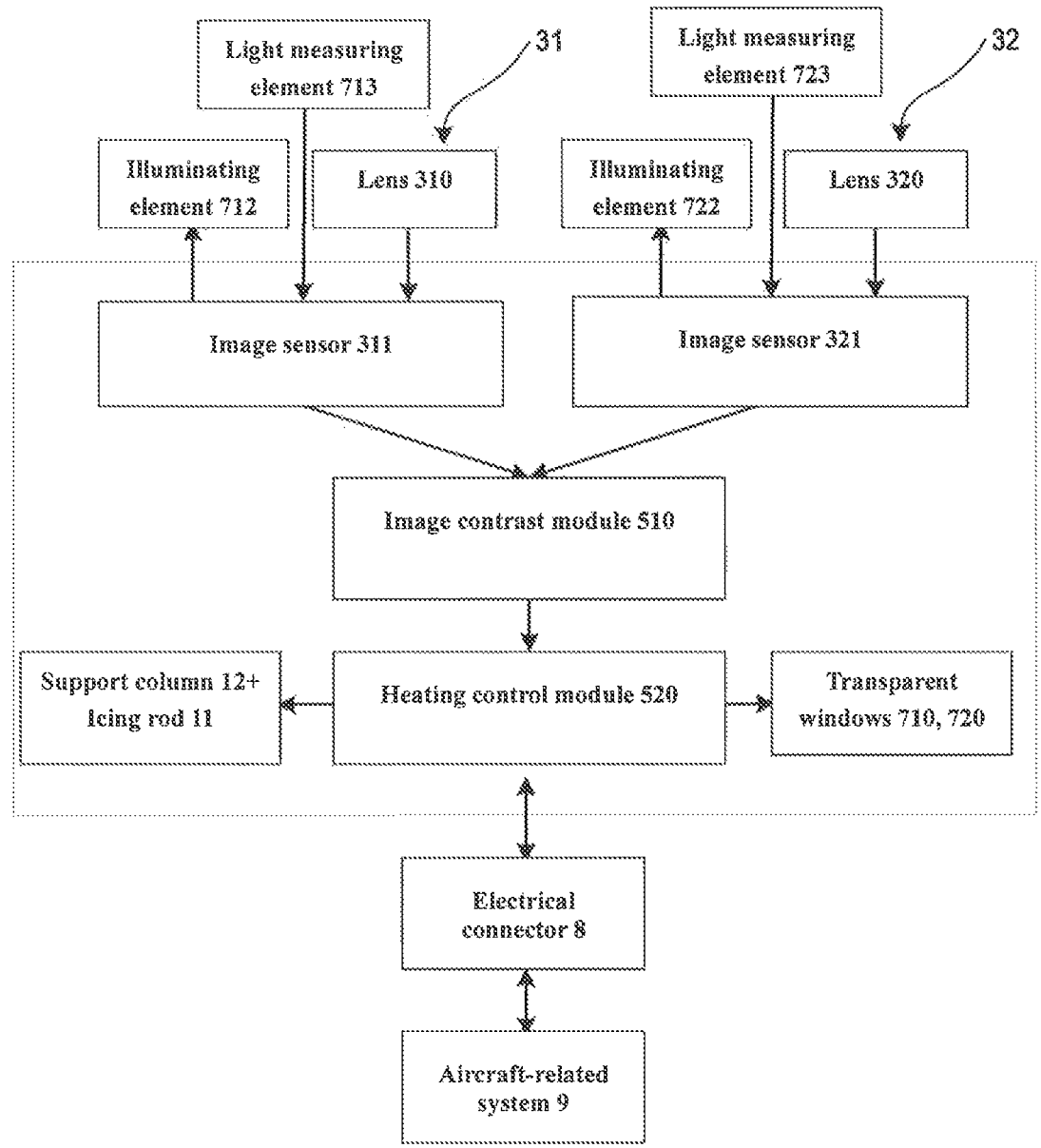
FIG. 6 illustrates a block diagram of functional modules of the ice detector according to a preferred embodiment of the present invention.

Again referring to FIGS. 1-4 in combination with FIG. 6, in the present preferred embodiment, there is a second visual sensor 32 disposed laterally opposed to the ice accretion surface 110 of the icing rod 11, i.e., exactly opposed to the ice accretion surface of a lateral side 114 of the icing rod. Like the visual sensor 31, the second visual sensor 32 comprises a second lens 320 and a second image sensor 321 (see FIG. 6). The second lens 320 is located in a second recessed chamber 72 of the flange plate 7 and exposed to obtain an image of the ice accretion surface 110, wherein the second recessed chamber 72 having a second transparent window 720 is angled relative to the first recessed chamber 71 at substantially a 90° angle, i.e., the second recessed chamber 72 is located relative to a lateral side of the icing rod 11 so that the second lens 320 laterally faces the ice accretion surface 110. Like the first recessed chamber 71, the second recessed chamber 72 has a second slant surface 721 on which are provided a second automatically adjustable illuminating element 722 and a second light measuring element 723 electrically connected to the second illuminating element 722.

Noticeably, the icing rod 11 is preferably provided with an electrical heater (not shown) for deicing, and meanwhile the transparent windows 710, 720 are preferably provided with an electrical heater (not shown) for preventing ice. To this end, the controller 5 preferably further comprises a heating control module 520 which is electrically connected to the image contrast module 510 and used to control the electrical heaters on the icing rod and the transparent windows to perform electrical heating.

Additionally, it should be appreciated that image sensors 310, 320 of the visual sensor 31 and the second visual sensor 32 may preferably be located in a housing of the controller 5.

Integral parts and their functions in the present preferred embodiment are respectively introduced below with reference to FIGS. 1-4 and FIG. 6.

The visual sensors 31, 32 may be miniature camera devices which shoot, at a certain frequency, images of the ice accretion surface 110 of the icing rod 11 under different light intensities.

Light measuring elements 713, 723 measure different light intensities of the external (namely, ambient environment) and may be photosensitive resistors.

Illuminating elements 712, 722 provide illumination for the icing rod 11 and may be automatically adjustable flash lamps or automatically adjustable illuminating elements. Under control of the image sensors 311, 321, the illuminating elements provide different illumination intensities according to different light intensities of the external.

Image sensors (CCD or CMOS) 311, 321 adjust illumination intensity and lens shutter according to the light intensity measured by the light measuring elements 713, 723 to obtain the images of the icing rod.

Lenses 310, 320 employ a fixed focal lens which depth of field can cover the whole icing rod 11.

Transparent windows 710, 720 with an electrical heater perform electrical heating under control of the heating control module 520 to ensure that the transparent window surface away from ice or mist and ensure that the light measuring elements 713 and 723, lenses 310, 320 and illuminating elements 712, 722 have a clear field of vision.

It should be appreciated that in practical use, the light measuring elements 713 and 723 may be disposed in the lenses or in the illuminating elements 712, 722.

The Icing Assembly 1:

The icing rod 11 with an electrical heater has a streamlined wing-shaped structure and has a smaller pressure coefficient (higher critical temperature) and larger water-collection coefficient.

The support structure 12 with an electrical heater has a length which guarantees a water droplet shield area of the icing rod 11.

The ice accretion surface of the icing rod 11 may be provided with marks as characteristic points for image contrast; color of the ice accretion surface 110 of the icing rod, color of the marks and color of the illumination light should be in a large contrast, for example, the color of the ice accretion surface uses green, the color of the marks uses red and the illumination lamp uses blue, which better outlines a shape of ice.

A material of the icing assembly 1 is not particularly limited.

Figure 5B:
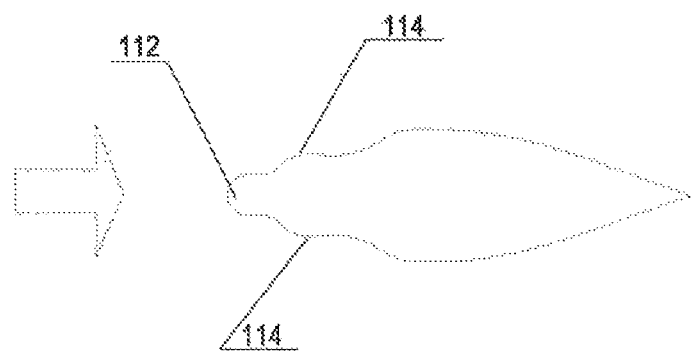
FIG. 5B illustrates a cross-sectional view of a second embodiment of an icing rod of the ice detector of FIG. 1, wherein an arrow indicates an air stream direction.

The icing rod 11 is designed streamlined, a curvature of the front edge 112 of the icing rod is designed smaller enough to ensure that a water-collection coefficient obtained by the icing rod tops 0.9, and the streamlines shape may ensure that the icing rod 11 obtains a smaller pressure coefficient (higher critical temperature); besides, the icing rod 11 is designed to have a sufficient length in a chordwise direction to ensure that supercooled large water droplets, in the event of break, splashing or the like, gradually release latent heat and then freeze on the ice accretion surface 110. The front edge 112 of the icing rod is designed cylindrical, as shown in FIGS. 5A and 5B. Preferably, the lateral side 114 of the icing rod is configured to be wavy in a chordwise direction (indicated by the arrows depicted in FIGS. 5A and 5B) as shown in FIG. 5B to facilitate water collection.

The Image Contrast Module 510:

The image contrast module 510 compares the icing rod image obtained from the image sensor 311, 321 with the icing rod image without ice stored in a memory by using an area characteristic method (shape). If the two images have a similarity lower than a threshold value, it is judged that ice is formed, an electrical interface (namely, an electrical connector) 8 is coordinated to send an icing signal which is transmitted to an aircraft-related system 9.

An image contrast procedure is mature technology and applied to aspects such as human image identification or entrance guard system, so it is not detailed any longer here.

Additionally, noticeably, the above controller 5 may further comprise a self-check module (not shown) which is responsible for performing BIT (self-check) for the ice detector. If a component fails, an electrical connector 8 is coordinated to send a fault signal which is transmitted to an aircraft-related system 9. The self-check function is mature technology and is not detailed any longer here.

The Electrical Connector 8

The electrical connector 8 is connected to an aircraft power source and outputs icing and fault signals generated by the visual detectors 31, 32; an interior of the controller 5 is connected to the image sensor 311, 321 via a bus interface. When real-time similarity value and icing rod images need to be obtained upon test flight, it is connected to a data collecting apparatus via the bus interface. The electric connector is mature technology and is not detailed any longer here.

Figure 7:
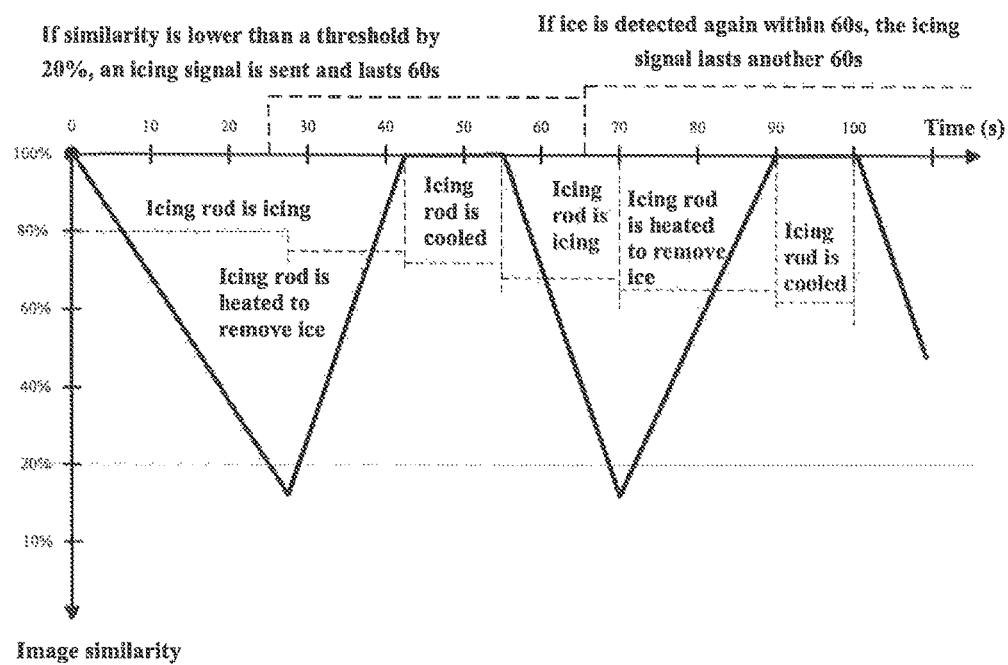
FIG. 7 illustrates a schematic diagram showing working principles of ice detection of the ice detector according to a preferred embodiment of the present invention, wherein ice detection is cyclically performed in a way of icing-detecting ice-heating to remove ice-cooling.

As shown in FIGS. 6 and 7, the lenses 310, 320 of the visual sensors 31, 32 shoot, at a certain frequency, images of the ice accretion surface of the front side and lateral side of the icing rod 11; the image contrast module 510 compares the icing rod image in presence of ice obtained from the image sensors 311, 321 with the icing rod image without ice stored in a memory to determine image similarity based on area characteristic algorithm. When the image similarity on the front side and/or lateral side is smaller than a set threshold, the electrical connector 8 is coordinated to send an icing signal for use by the aircraft user system 9. Meanwhile, the heating control module 520 performs electrical heating for the icing rod 11 and the support rod 12. After the ice is removed and the icing rod gets cool, ice detection enters next cycle of ice accretion on the icing rod-detecting ice-heating to remove ice-cooling of the icing rod; the heating control module 520, with a certain power, heats the transparent windows 710, 720 to prevent the transparent windows from ice and/or mist; the self-check module performs BIT for respective parts, the controller 5 and the electrical connector 8, and in event of a fault, sends a fault signal which will be recorded and processed by the aircraft user system 9.

Advantages of the present embodiments are as follows:

a. Arranging the refrigerating element on the icing rod assembly (described more fully below) to perform active refrigeration for the icing rod may further reduce the surface temperature of the icing rod and facilitate ice accretion on the icing rod before ice is formed on the wing/nacelles.

b. the outer shape may be optimized through aerodynamic analysis and droplet impingement analysis to make it have a smaller pressure coefficient and a larger water collection coefficient; the smaller pressure coefficient means that the icing rod has a lower surface temperature and a higher critical temperature and is more liable to ice accretion; the larger water collection coefficient means a larger amount of ice accretion in a per unit time; it facilitates ice accretion on the icing rod before ice is formed on the wing/nacelles.

c. the icing rod has a sufficient length in a chordwise direction to ensure that supercooled large water droplets, in the event of break, splashing or the like, freeze on the side of the icing rod, that is to say, the ice detector of the present invention has an ability to detect supercooled large water droplets so that the use scope of the ice detector of the present invention is expanded.

d. the material of the icing rod may be metal or other materials; the positions of the icing rod and the visual sensor are arranged in a coordinated manner to better obtain the ice image of the icing rod; besides, the material, shape and arrangement manner of the probe in the present invention exhibit larger flexibility.

The operation procedure of the ice detector of the above embodiment will be described as follows with reference to FIG. 7 in combination with FIG. 6:

Step S1: the image sensor 311 and image sensor 321, at a certain frequency for example once 1 second, measure light intensity via the light measuring elements 713, 723, control the light illuminating elements 712, 722 and the lenses 310, 320, and meanwhile shoot images of the ice accretion surface 110 of the front side and lateral side of the icing rod 11;

Step S2: the image contrast procedure goes as follows: comparing the shot images of the front side and lateral side of the icing rod with images of the front side and lateral side of the icing rod without ice stored in a memory by using area characteristic algorithm. When the image similarity on the front side and/or lateral side is smaller than a threshold, e.g., 20%, icing is judged and an icing signal lasting a certain time period for example 60 seconds will be sent;

Step S3: after obtaining the icing signal, the heating control module 520 begins to perform electrical heating for the icing rod 11 and the support rod 12 to remove ice; after the icing rod cools, ice begins to be formed again; if icing is detected again within 60 seconds, the icing signal will last another 60 seconds, and steps S1 and S2 are repeated.

Step S4: the heating control module 520 constantly performs electrical heating for the transparent windows 710, 720 to prevent ice accretion to keep the transparent windows transparent.

In addition, in the above embodiment of the present invention, the icing assembly further preferably comprises a semiconductor refrigerating element. As shown in FIGS. 8A-8D), the icing assembly 1' in a preferred embodiment comprises an icing rod 11', a support rod 12' and a semiconductor refrigerating element 13', wherein the semiconductor refrigerating element 13' is longitudinally disposed between the icing rod 11' and the support rod 12'. As shown in FIG. 8D for example, a cold end 131' of the semiconductor refrigerating element 13' is connected to the icing rod 11' to perform active refrigeration for the icing rod 11', and a hot end 133' is connected to the support rod 12' and dissipates heat via the support rod 12'. Upon operation, the semiconductor refrigerating element 13' cools the icing rod 11' ΔT° C. temperature (generally 1-2° C.), i.e., the temperature of the icing rod decreases by ΔT° C. as compared with an ambient temperature. As such, on the basis that the above preferred embodiment of the present invention employs the optimized icing rod shape, arranging the semiconductor refrigerating element on the icing rod assembly to perform active refrigeration for the icing rod may further reduce the surface temperature of the icing rod and facilitate ice accretion on the icing rod before ice is formed on the wing/nacelles so that the ice detector detects ice accretion before ice is formed on the wing/nacelle such that subsequent countermeasures are taken.

Figures 9A, 9C:
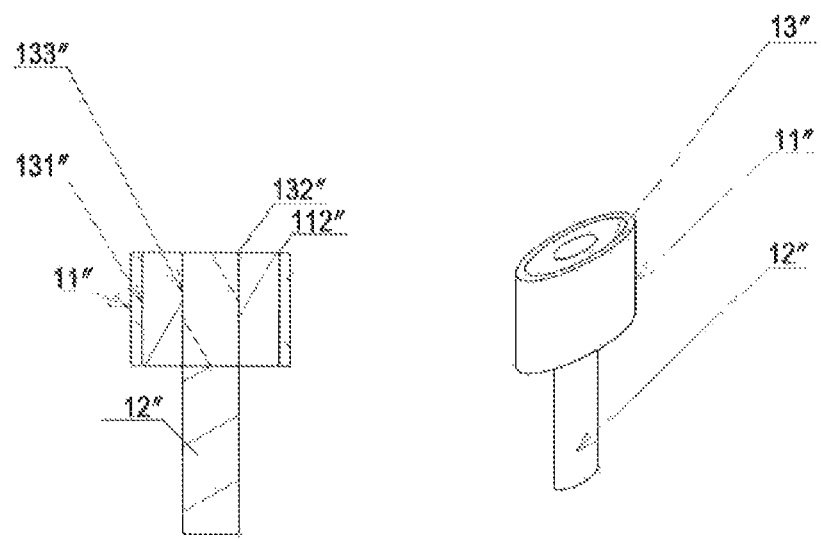
FIG. 9A illustrates an isometric diagram of another preferred embodiment of an icing assembly of the ice detector of FIG. 1, wherein a semiconductor refrigerating element is arranged between an icing rod and a support structure in an in-out direction along the circumference.
FIG. 9C illustrates a sectional view taken along line A-A of the icing assembly of FIG. 9B.
Figure 9B:
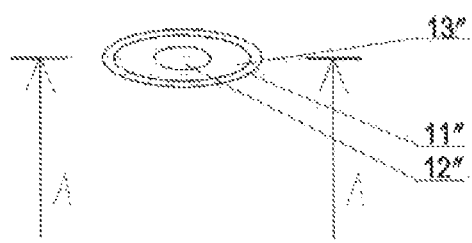
FIG. 9B illustrates a top planar view of the icing assembly of FIG. 9A.

FIGS. 9A-9C illustrate another preferred embodiment of the icing assembly, wherein the semiconductor refrigerating element is arranged between the icing rod and the support structure in an in-out direction along the circumference. The semiconductor refrigerating element 13" may be made in a shape of a concentric elliptical ring, its periphery is a cold end 131" connected to the icing rod 11", and its interior is a hot end 133" connected to the support 12". Heat may be transferred from an upper half of the support rod 12" to its lower half, and then dissipated. Specifically, in the another preferred embodiment of the icing assembly, the icing rod 11" has a first inner cavity 112", and the semiconductor refrigerating element 13" is disposed in the first inner cavity 112" of the icing rod 11"; the semiconductor refrigerating element 13" has a second inner cavity 132" and an upper end of the support rod 12" extends into the second inner cavity 132"; the cold end 131" of the semiconductor refrigerating element is outside and the hot end 133" is inside. It should be appreciated that the semiconductor refrigerating element itself is based on Peltier principle, and is mature application and not detailed any longer here.

Figure 10B:
FIG. 10B is a sectional view taken along line D-D of the icing assembly of FIG. 10A.

Furthermore, although the illuminating element together with the lens is disposed in the recessed chamber in the above preferred embodiments of the ice detector of the present invention, it should be appreciated that an illuminating element may be disposed in the icing rod. FIG. 10 OA and FIG. 10B illustrate a further preferred embodiment of the icing assembly. In this embodiment, the icing rod 11''' carries an electrical heater and is transparent, e.g., the transparent icing rod with an electrical heater is made of transparent glass (or other transparent material) with an electrical heater, and two sets of illuminating elements, namely, a third illuminating element 141''' and a fourth illuminating element 143''', are preferably disposed therein, wherein the third illuminating element 141''' mainly provides illumination for the front edge of the icing rod, and the fourth illuminating element 143''' provides illumination for a middle portion and a rear portion of the icing rod. Provision of the illuminating elements in the icing rod 11''' can better outline the shape of ice to cooperate with the visual sensor to obtain images of the icing rod under different light intensities. Additionally, it should be appreciated that after measuring the light intensity, the light measuring elements 713, 723 in the above preferred embodiments of the present invention controls the two sets of illuminating elements in the icing rod 11''' to better obtain the images of the ice accretion surface on the front side and the lateral side of the icing rod 11'''.

Figure 10A:
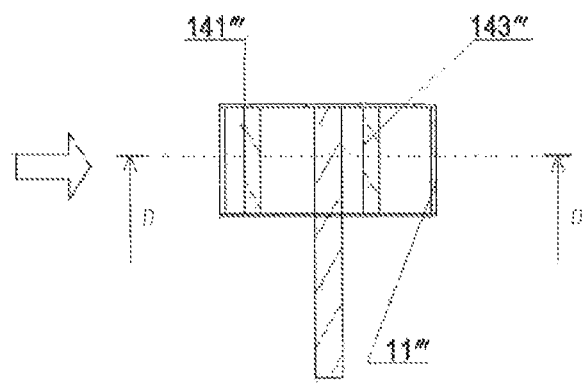
FIG. 10A illustrates a longitudinal sectional view of a third embodiment of an icing assembly of the ice detector of FIG. 1, wherein an arrow indicates an air stream direction.

It should be appreciated that the icing assembly shown in FIG. 8A-FIG. 8D may completely employ the icing rod structure shown in FIG. 10A-FIG. 10B, i.e., the icing rod of the icing assembly shown in FIGS. 8A-8D is also made of a transparent material, and illuminating elements are disposed therein. Certainly, illuminating elements may also be disposed in the icing rod shown in FIG. 9A-FIG. 9C if needed. Besides, regarding the streamlined wing-shaped structure of the icing rod, namely, the icing rod configuration as shown in FIG. 5A and FIG. 5B, it is suitable in the icing assembly in any one of the above preferred embodiments.

The technical contents and technical features of the present invention are already revealed as above. However, it should be appreciated that as guided by the creation idea of the present invention, those skilled in the art can make various modifications and improvements to the above structure and shape, including combinations of technical features individually revealed herein or sought for protection, obviously including other combinations of these features. These variations and/or combinations all fall within the technical field to which the present invention relates to and fall within the protection scope of claims of the present invention. It is noticeable that according to practice, a single element used in claims means comprising one or more such elements. Besides, any reference signs in the claim set should not be construed as limiting the scope of the present invention.

| Listing of parts: | |
|---|---|
| 1 icing assembly | |
| 11 icing rod | 12 support rod |
| 110 ice accretion surface | |
| 31 visual sensor | 32 a second visual sensor |
| 310 lens | 320 a second lens |
| 311 image sensor | 321 second image sensor |
| 5 controller | |
| 510 image contrast module | |
| 7 flange plate | |
| 71 recessed chamber | 72 second recessed chamber |
| 710 transparent window | 720 second transparent window |
| 711 slant surface | 721 second slant surface |
| 712 illuminating element | 722 second illuminating element |
| 713 light measuring element | 723 second light measuring element |
| 8 electrical connector | |
| 9 aircraft user system | |
| 1' icing assembly | |
| 11' icing rod | 12' support rod |
| 13' semiconductor refrigerating element | |
| 131' cold end | 133' hot end |
| 1" icing assembly | |
| 11" icing rod | 12" support rod |
| 112" first inner cavity | |
| 13" semiconductor refrigerating element | |
| 131" cold end | 133" hot end |
| 132" second inner cavity | |
| 1''' icing assembly | |
| 11''' icing rod | 12''' support rod |
| 112''' first inner cavity | |
| 141''' third illuminating element | 143''' fourth illuminating element |

What is claimed is:
1. An ice detector, comprising:
an icing assembly including a transparent icing rod having an ice accretion surface and a support structure;
at least one visual sensor configured to obtain an image of the ice accretion surface;
a controller electrically connected to the visual sensor and including an image contrast module configured to compare the image obtained from the visual sensor with an initial image of the ice accretion surface so as to judge whether ice is formed on the ice accretion surface of the icing rod;

wherein the icing assembly further includes a refrigerating element respectively connected to the icing rod and the support structure;

wherein the ice detector further comprises a flange plate connected between the icing assembly and the controller, a recessed chamber with a transparent window being provided on the flange plate, and a lens of the visual sensor being exposed in the recessed chamber.

2. The ice detector according to claim 1, wherein the refrigerating element is a semiconductor refrigerating element having a cold end that is connected to the icing rod to perform active refrigeration for the icing rod, and wherein the semiconductor refrigerating element having a hot end that is connected to the support structure and dissipates heat via the support structure.

3. An ice detector, comprising:
an icing assembly including a support structure and a transparent icing rod having an ice accretion surface, the icing assembly also including a semiconductor refrigerating element connected to the icing rod and to the support structure, wherein an illuminating element is disposed in the icing rod;
at least one visual sensor configured to obtain an image of the ice accretion surface;
a controller electrically connected to the visual sensor and including an image contrast module configured to compare the image obtained from the visual sensor with an initial image of the ice accretion surface so as to judge whether ice is formed on the ice accretion surface of the icing rod; and
wherein the icing rod has a first inner cavity in which the semiconductor refrigerating element is disposed; and the semiconductor refrigerating element has a second inner cavity into which an upper end of the support structure extends; wherein the cold end of the semiconductor refrigerating element is outside and the hot end is inside.

4. The ice detector according to claim 1, wherein the icing rod is constructed as a streamlined wing-shaped structure.

5. The ice detector according to claim 4, wherein the icing rod has a lateral side that defines a chordwise direction and is configured to be wavy in the chordwise direction.

6. The ice detector according to claim 5, wherein the icing rod has a sufficient length in the chordwise direction to ensure that supercooled large water droplets, in the event of break, splashing, can freeze on the lateral side of the icing rod.

7. The ice detector according to claim 1, wherein the icing rod is transparent and an illuminating element is disposed therein.

8. The ice detector according to claim 7, wherein at least a second visual sensor is arranged laterally opposed to the ice accretion surface.

9. The ice detector according to claim 1, wherein each of the at least one visual sensor at least includes a lens and an image sensor, wherein the lens is used to obtain the image of the ice accretion surface, and the image sensor is electrically connected to and transmits the image to the image contrast module of the control unit.

10. The ice detector according to claim 9, wherein the recessed chamber has a slant surface facing towards the icing assembly, and the lens is exposed from the slant surface.

11. The ice detector according to claim 10, wherein the slant surface of the recessed chamber is provided with an automatically adjustable illuminating element.

12. The ice detector according to claim 1, wherein the illuminating element comprises two sets of illuminating elements which are respectively disposed at a front edge and a middle-rear portion of the transparent icing rod.

13. The ice detector according to claim 1, wherein the ice accretion surface of the icing rod is provided with color marks facilitating color identification.

* * * * *